3,437,607
POLYURETHANE PRE-MIXES CONTAINING DIHYDROXY NITROGEN CONTAINING PHOSPHONATES
Abdul-Munim Nashu, Hamden, Harold E. Reymore, Jr., Wallingford, and Adnan A. R. Sayigh, North Haven, Conn., assignors to The Upjohn Company, Kalamazoo, Mich., a corporation of Delaware
No Drawing. Filed Mar. 31, 1965, Ser. No. 444,413
Int. Cl. C08g 22/08, 51/58
U.S. Cl. 260—2.5   1 Claim

ABSTRACT OF THE DISCLOSURE

Storage stable premixes, intended for ultimate admixture with polyisocyanates to yield polyurethane foams, are provided. The premixes contain a conventional polyurethane-forming polyol, a blowing agent, a polyurethane catalyst and a phosphorus-containing polyol having the formula:

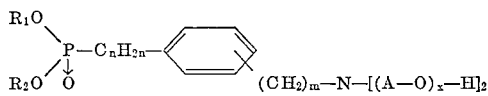

wherein $R_1$ and $R_2$ are lower-alkyl, A is alkylene ($C_2$–$C_8$), $n=0$–8, $m=0$ or 1 and $x=1$–3. Reactivity of these premixes with polyisocyanates shows no significant change on storage over prolonged periods.

---

This invention relates to novel polyurethane foams and to methods for their preparation and is more particularly concerned with polyurethane foams which have incorporated therein novel phosphorus and nitrogen containing polyols, and with methods of preparing such foams.

This invention, in its broadest aspect, comprises a process for producing fire-retardant polyurethanes by incorporation into the polyurethane producing reaction mixture of a phosphorus-containing polyol having the formula:

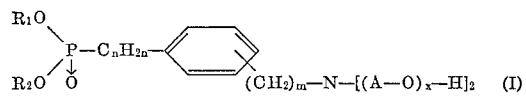

wherein $R_1$ and $R_2$ each represent lower-alkyl, A is alkylene having 2 carbon atoms separating the valencies and a total carbon atom content of from 2 to 8, inclusive, $n$ is an integer from 0 to 8, inclusive, $m$ is an integer from 0 to 1 and $x$ is an integer from 1 to 3, inclusive. When $n$ has a value of 1 to 8 the group $C_nH_{2n}$ is selected from the class consisting of a straight-chain and branched chain lower-alkylene radical. The substituents in the benzene ring of Formula I can be in ortho, meta, or para positions with respect to each other.

The term "fire retardant polyurethanes" employed herein is one well recognized and widely used in the art. It is generally understood to mean, and will be used herein as meaning, a polyurethane which, in the case of foam and sheeting shows a rating of at least "self-extinguishing" in the ASTM D-1692-59T procedure, and which, in the case of a film or coating of 0.05 in. or less in thickness shows a rating of at least "self-extinguishing" in the ASTM-D568-56T procedure.

The term "lower-alkyl" means alkyl containing from 1 to 8 carbon atoms, inclusive, such as methyl, ethyl, propyl, butyl, pentyl, hexyl, heptyl, octyl, and isomeric forms thereof. The term "alkylene having 2 carbon atoms separating the valencies and a total carbon atom content of from 2 to 8, inclusive," means an ethylene group one or more hydrogen atoms of which can be substituted by alkyl provided that the total carbon atom content of the resulting group is within the stated limits. Examples of such alkylene groups are ethylene[—$CH_2CH_2$—],

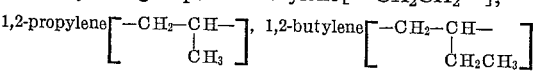

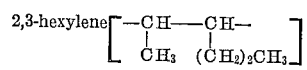

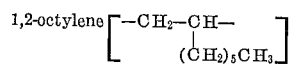

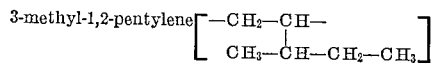

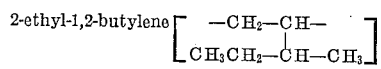

and the like. The term "straight-chain and branched chain lower-alkylene" means straight chain and branched chain alkylene containing from 1 to 8 carbon atoms, inclusive, such as ethylene, 1,2-propylene, $$\text{trimethylene}[—(CH_2)_3—]$$
$$\text{tetramethylene }[—(CH_2)_4—]$$
$$\text{pentamethylene}[—(CH_2)_5—]$$
$$\text{hexamethylene}[—(CH_2)_6—]$$
$$\text{octamethylene}[—(CH_2)_8—]$$

1,3-butylene $\left[-CH_2-CH_2-\underset{\underset{CH_3}{|}}{C}H-\right]$ 1,2-hexylene $\left[-CH_2-\underset{\underset{(CH_2)_3-CH_3}{|}}{C}H-\right]$ 1,4-octylene $\left[-CH_2-\underset{\underset{(CH_2)_5CH_3}{|}}{C}H-\right]$ 2-methyl-1,3-butylene $\left[-CH_2-\underset{\underset{CH_3}{|}}{C}H-\underset{\underset{CH_3}{|}}{C}H-\right]$ 3-ethyl-1,4-hexylene $\left[-CH_2-CH_2-\underset{\underset{CH_2CH_3}{|}}{C}H-\underset{\underset{CH_2CH_3}{|}}{C}H-\right]$ 2,2-dimethyl-1,3-pentylene $\left[-CH_2-C(CH_3)_2-\underset{\underset{CH_2CH_3}{|}}{C}H-\right]$ and the like.

It is known in the art that polyurethane compositions, including rigid, semi-rigid and flexible cellular compositions, elastomers, sealants and the like, can be rendered fire-retardant, or can have their inherent fire retardant properties increased, by replacing a part or the whole of the polyol used in the preparation of the polyurethane by a polyol which contains phosphorus; see, for example, U.S. Patents 3,144,419; 3,142,651; 3,142,650 and 3,134,-742.

Many of the phosphorus containing polyols hitherto employed suffer from the disadvantage that they are unstable when stored in combination with other components normally employed in the fabrication of polyurethanes. It is common practice to supply two component systems for the manufacture of polyurethanes, one component being a polyisocyanate or an isocyanate-terminated prepolymer, and the second component being a mixture of the polyols, surfactants, catalysts and like additives. The two components are stored separately until they are mixed to produce the desired polyurethane.

When a phosphorus containing polyol is to be employed in the production of a polyurethane, it is desirable to include it as part of the second component (i.e. polyols plus additives). It is therefore desirable to employ a phosphorus containing polyol which is stable on storage in admixture with the other components of the polyol mixture. The polyols which are employed in accordance with the present invention meet this requirement and possess marked advantages in this respect over closely related phosphorus containing polyols. In particular, the compounds having the Formula I are significantly more stable when stored in admixture with polyols and additives normally employed in the art, than are the structurally related compounds having the formula:

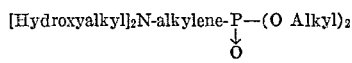

of which class of compounds diethyl N,N-di(2-hydroxyethyl)aminomethylphosphonate is typical and is widely used as a fire retardant for polyurethanes.

In addition to their advantages in stability on storage, the compounds of Formula I impart excellent fire retardant properties to the polyurethanes to which they are converted without in any way affecting the other desirable properties of the polyurethane. For example, the compounds having the Formula I can be employed to replace a part or the whole of the polyols conventionally employed in the preparation of rigid polyurethane foams and so produce rigid foams which possess excellent fire retardant properties and still possess the strength, dimensional stability, and insulating capacity of foams produced using conventional polyols.

Accordingly it is an object of the invention to provide a method of imparting fire retardant properties to polyurethanes or, alternatively, of enhancing the inherent fire retardant properties of polyurethanes. It is a further object of the invention to provide novel polyurethanes prepared from polyols having the Formula I above. It is yet a further object of the invention to provide polyol mixtures which are stable on storage in admixture with catalysts, foaming agents and like additives normally employed in the formation of polyurethanes.

These objects are achieved by replacing a portion of the polyol conventionally employed in producing polyurethanes by a compound having the Formula I above or by mixtures of two or more compounds having the Formula I above. Advantageously the amount of the compound having the Formula I, or mixtures of such compounds, which is employed according to the process of the invention is from about 5% to about 90%, based on hydroxyl equivalent, of the total polyols used in making the polyurethane. Preferably the amount of compound of Formula I, or mixtures of such compounds, which is employed according to the invention is sufficient to provide a phosphorus content from about 0.5 to about 3.0 percent by weight in the resulting polyurethane. A particularly preferred amount of compound of Formula I or a mixture of such compounds, which is employed according to the invention is that amount which is sufficient to provide a phosphorus content from about 1.0 to about 1.2 by weight in the resulting polyurethane.

In the preparation of polyurethanes according to the invention conventional procedures are employed, the novel feature of the invention residing in the replacement of a portion, within the ranges defined above, of the conventional polyol by a compound of the Formula I above or by a mixture of such compounds. While the use of the Compounds I can be applied to the formation of any type of polyurethane including cellular and non-cellular polyurethanes, it is of particular application in the preparation of cellular polyurethane products. Accordingly the process of the invention will be illustrated by reference to the preparation of cellular products but it is to be understood that the invention is not limited thereto but is of general application to the preparation of polyurethanes of all types.

The various methods for the preparation of polyurethane foams are well known in the art and do not require detailed discussion; see, for example, Dombrow, "Polyurethanes," Reinhold Publishing Corp., New York, pp. 1–105 (1957); Saunders et al., "Polyurethanes," Part I, Interscience Publishers, New York (1962).

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4-diphenylmethane diisocyanate, dianisidine, diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730; 2,950,263 and 3,012,008; Canada Patent No. 665,495; and German Patent 1,131,877. A particularly preferred polyisocyanate of this type is the polymethylene polyphenyl isocyanate available commercially under the trademark PAPI®.

Similarly any of the prior art polyols conventionally employed in the preparation of foams can be employed in the process of the invention. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydrquinone, orcinol, 2,2-bis(p-hydroxyphenyl)propane, bis(p-hydroxyphenyl) methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis-(hydroxyphenyl) ethanol, pyrogallol, phloroglucinol, tris(hydroxyphenyl) alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3 - tetrakis(hydroxy-3-methylphenyl)propanes, 1,1,4,4-tetrakis(hydroxyphenyl) butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated cross-linking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N,N',N' - tetrakis(2 - hydroxypropyl)ethylenediamine, N,N,N',N'-tetrakis(2-hydroxyethyl)ethylenediamine, and the like, and alkylene oxide reaction products of sugars such as sucrose, and the like, In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with a reactive hydrogen containing compound can be employed for this purpose; see, for example, Saunders et al. ibid, volume I, pp. 228–232; see also Britain et al. "J. Applied Polymer Science," 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, moylbdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N',N'-tetraethylethylene diamine, N-methylmorpholine, N-ethylmorpholine, N,N,N',N'-tetramethylguanidine, N,N,N',N' - tetramethyl-1,3-butanediamine, N,N-dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. Thus said ratio is advantageously within the range of from 1.50 to 0.65:1 and preferably within the range of 1.20:1 to 1:1, whether the isocyanate and polyol (i.e. mixture of conventional polyol and polyol of Formula I) are employed separately in the one-shot process or whether the two components have been reacted to form a prepolymer. The lower ratio of ranges of isocyanate to active hydrogen group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1 - dichloro-1-fluoroethane, 1-chloro-1, 1-difluoro-2, 2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available under the trade name L–5320 is typical of such polymers. Other surfactants such as ethylene oxide modified sorbitan monopalmitate or ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The fire retardant polyurethanes produced in accordance with the present invention are useful for the purposes for which polyurethanes are conventionally employed. For example, the rigid and semi-rigid polyurethane foams produced according to the invention are useful for insulating purposes either as slab stock or in preformed building panels and because of their ability to hold lubricants and to resist torque, as transmission plates in power transmission systems using fluids and in similar systems. The flexible foams produced according to the invention are useful for a variety of cushioning upholstery and like uses. The elastomeric polyurethanes produced in accordance with the invention find application in the preparation of gaskets flexible tubing and the like.

The compounds having the Formula I above which are employed in the process and compositions of the invention are for the most part known in the art. The compounds of Formula I wherein $m=0$, $x=1$, A is ethylene and $R_1$, $R_2$, and $C_nH_{2n}$ have the significance above defined, are described in U.S. Patent 3,134,800. Those compounds of Formula I wherein $n=0$ to 3, $x=1$, A is ethylene and $R_1$, $R_2$ and $m$ have the significance herein before defined are described by Kagan et al. J. Am. Chem. Soc. 81, 3026–31, 1959. In general, the compounds of Formula I can be prepared by reacting the corresponding amine having the formula

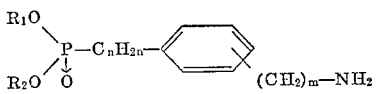

wherein $R_1$, $R_2$, $n$ and $m$ have the significance herein before defined, with the appropriate alkylene oxide or mixture of alkylene oxides using the conditions described by Kagan for the reaction of such amines with ethylene oxide. By employing the appropriate proportions of amine and alkylene oxide in this reaction, the compounds of Formula I can be obtained wherein $x$ has any of the values from 1 to 3.

If the condensation is carried out in the presence of acid, such as aqueous acetic acid, the compounds wherein $x=1$ are obtained even though excess alkylene oxide is employed. To obtain the corresponding compounds in which $x=2$ or 3, it is necessary to carry out the reaction in the presence of base such as sodium hydroxide, potassium hydroxide, sodium methoxide and the like using the appropriate quantity of alkylene oxide.

The amines of the above formula wherein $m$ is zero and $R_1$, $R_2$, and $n$ have the values above defined can be prepared by reacting the appropriate phenylalkyl bromide with the appropriate trialkyl phosphite under the conditions described by Kagan, supra, followed by nitration of the resulting dialkyl phenylalkane phosphonate and reduction of the resulting dialkyl nitrophenylalkylphosphonate to the desired amine. The nitration and reduction are carried out conveniently using the procedure described by Kagan. The amines having the above formula wherein $m$ is 1 and $R_1$, $R_2$ and $n$ have the significance above defined, can be prepared by reaction of the appropriate cyanophenylalkylbromide with the appropriate trialkylphosphite to give the corresponding dialkyl cyanophenylalkanephosphonate followed by reduction of the latter to give the desired amine. Both reactions are advantageously carried out under the conditions described by Kagan, supra.

The following preparations and examples describe the manner and process of making and using the invention and set forth the best-mode contemplated by the inventors of carrying out the invention but are not to be construed as limiting.

PREPARATION 1

*Diethyl p-[N,N-bis(2-hydroxypropyl)amino]benzylphosphonate*

A mixture of 243 g. (1 mole) of diethyl p-aminobenzylphosphonate (Kagan et al. supra), 58 g. of glacial acetic acid and 940 ml. of water was stirred and cooled at 0° C. to 4° C. while a total of 500 g. (8.4 mole) of propylene oxide was added to the mixture over a period of 1 hour. The mixture so obtained was then allowed to stand overnight at approximately 25° C. before being neutralized by the addition of aqueous sodium carbonate solution. The organic layer which separated was extracted with three 200 ml. portions of methylene chloride. The combined methylene chloride extracts were washed with water and dried over anhydrous sodium sulfate. The dried solution was filtered and the filtrate was evaporated to dryness. There was thus obtained 202.5 g. (61.3% yield) of diethyl p-[N,N - bis(2 - hydroxypropyl)amino]benzylphosphonate in the form of an oil.

Using the above procedure, but replacing propylene oxide by 1,2-butylene oxide, 2,3-pentylene oxide, or 1,2-octylene oxide, there are obtained diethyl p-[N,N-bis(2-hydroxybutyl)amino]benzylphosphonate, diethyl p-[N,N-bis(3 - hydroxy - 2 - pentyl)amino]benzylphosphonate and diethyl p-[N,N - bis(2 - hydroxyoctyl)amino]benzylphosphonate, respectively.

PREPARATION 2

*Diethyl p-[N,N-bis(5-hydroxy-2-methyl-3-oxahexyl)-amino]benzylphosphonate*

A mixture of 243 g. (1 mole) of diethyl p-aminobenzylphosphonate (Kagan et al., supra) and 0.4 g. of sodium hydroxide is stirred under nitrogen while a total of 236 g. (4 moles) of propylene oxide is added. The resulting mixture is stirred for several hours before being diluted with methylene chloride, washed with water, and dried over anhydrous sodium sulfate. The dried solution is filtered and the filtrate is evaporated to dryness to yield diethyl p-[N,N - bis(5 - hydroxy-2-methyl-3-oxahexyl)-amino]benzylphosphonate in the form of an oil.

Using the above procedure, but increasing the amount of propylene oxide to 354 g. (6 mole) there is obtained diethyl p-[N,N - bis(8 - hydroxy - 2,5 - dimethyl - 3,6 - dioxanonyl)amino]benzylphosphonate.

EXAMPLE 1

A rigid polyurethane foam incorporating diethyl p-[N,N-di(2-hydroxyethyl)amino]benzylphosphonate was prepared as follows:

A mixture of 71 g. (0.55 equiv.) of a polyol of eq. wt.=128 (a blend of (i) an adduct of propylene oxide and a methylene bridged polyphenyl polyamine mixture obtained by acid condensation of aniline and formaldehyde and (ii) a glycerol-propylene oxide adduct), 29 g. (0.088 equiv.) of diethyl p-[N,N-(2-hydroxyethyl)amino-benzyl]phosphonate, 2 g. of DC-201 (an organosilicone polymer surfactant), 1 g. of N,N,N',N'-tetramethyl-1,3-butanediamine, and 0.4 g. of triethylamine was prepared using a mechanical blender. Freon 11-B (stabilized trichlorofluoromethan) was introduced into the mixture until an overall weight increase of 34 g. was attained. To the resulting mixture was added 115 g. (0.86 equiv.) of PAPI® (polymethylene polyphenylisocyanate, eq. wt. =133, viscosity=270 cps. at 25° C.) with vigorous stirring and the mixture so obtained was poured as quickly as possible into an open mold (dimensions 7" x 7" x 12") and allowed to rise freely. After allowing the resulting foam to cure at approximately 25° C. for 24 hours the foam was found to have the following properties:

| | |
|---|---|
| Density [1] lbs./cu. ft. | 1.80 |
| Comp. str., // to rise [1] p.s.i. | 21.9 |
| Percent vol. change at 100% RH [1]: | |
| 158° F. after: | |
| 24 hours | +11.9 |
| 7 days | +16.7 |
| 14 days | +23.6 |
| 100° F. after: | |
| 24 hours | +1.6 |
| 7 days | +1.7 |
| 14 days | +2.2 |
| Percent vol. change at 200° F. (dry heat)[1] after: | |
| 3 days | +5.2 |
| 7 days | +6.8 |
| Flame test (ASTM 1692–59T) | ⅞" burned; non-burning |

[1] These tests were carried out using the procedure defined in "Physical Test Procedures for Rigid Urethane Foams" published by Market Development Section, Atlas Chemical Industries, Inc., Wilmington, Del., Bulletin Nos. D46–12–2823, D47–12–2823 and D413–12–2823, Feb. 1, 1962.

EXAMPLE 2

Using the procedure described in Example 1 but employing only 69 g. (0.54 equiv.) of the polyol blend of eq. wt.=128 and replacing the diethyl p-N,N-di(2-hydroxyethyl)aminobenzylphosphonate by 31 g. (0.086 equiv.) of diethyl p-N,N-di(2-hydroxypropyl)aminobenzylphosphonate (prepared as described in Example 1) there was obtained a rigid foam having the following properties:

Phosphorus content _____ 1.11% by weight.
Density [1] _____ 1.83 p.c.f.
Comp. strength, // to rise [1] _____ 31.4 p.s.i.
Percent volume change at 100% RH [1]
  158° F. after:
    24 hours _____ +10.0.
    7 days _____ +16.2.
    14 days _____ +18.1.
  100° F. after:
    24 hours _____ +1.6.
    7 days _____ +1.7.
    14 days _____ +1.9.
Percent volume change at 200° F.
  (dry heat) [1] after:
    3 days _____ +4.4.
    5 days _____ +6.5.
Flame test (ASTM 1692-59T)         1 3/16" burned,
  classification.                    Self extinguishing.

[1] These tests were conducted using the procedures noted in Example 1.

Similarly, using the procedure described in Example 1, but replacing diethyl p-N,N-di(2-hydroxyethyl)aminobenzylphosphonate by other phosphorus containing polyols of Formula I above such as:

diethyl p-N,N-di(2-hydroxyethyl)aminomethylbenzylphosphonate
diethyl p-N,N-di(2-hydroxyethyl)aminophenylphosphate
dimethyl p-N,N-di(2-hydroxyethyl)aminobenzylphosphonate
diisopropyl p-N,N-di(2-hydroxyethyl)aminobenzylphosphonate
dibutyl o-N,N-di(2-hydroxyethyl)aminophenethylphosphonate
diethyl p-N,N-di(2-hydroxyethyl)amino-α-methylbenzylphosphonate
diethyl 3-[p-N,N-di(2-hydroxyethyl)aminophenyl]propylphosphonate
diethyl p-N,N-di(5-hydroxy-2-methyl-3-oxahexyl)aminobenzylphosphonate, there are obtained fire retardant-rigid polyurethane foams.

EXAMPLE 3

A flexible foam incorporating diethyl p-N,N-bis(2-hydroxyethyl)aminobenzylphosphonate and having a phosphorus content of 1.04% by weight was prepared as follows:

A mixture of 80 g. (0.53 equiv.) of TPE-4542 (polyoxyalkylene derivative of trimethylolpropane M.W. 4500), 20 g. (0.06 equiv.) of diethyl p-N,N-bis(2-hydroxyethyl) aminobenzylphosphonate, 0.5 g. of DC-202 (organosilicone copolymer surfactant), 1.0 g. of Y-4499 (organosilicone cell opener), 0.5 g. of N,N,N',N'-tetramethylguanidine, 0.3 g. of dibutyltindilaurate and 3.6 g. of water was prepared by mechanical blending and to the mixture was added, with stirring, 75 g. (0.581 equiv.) of Carwinate-390P (a low viscosity polymethylene polyphenyl isocyanate; equivalent weight=129.0). The resulting mixture was transferred as quickly as possible to a mold (dimensions 7" x 7" x 12") and allowed to foam freely. There was thus obtained a fire retardant flexible foam classified as "self-extinguishing" when tested according to the ASTM 1692-59T Flame Test for cellular plastics.

EXAMPLE 4

The stability of various compounds of Formula I above on storage in admixture with other components of a polyol mix was determined as follows:

The following polyol mixes were prepared: (all amounts of ingredients in parts by weight)

| | A | B | C |
|---|---|---|---|
| Polyol blend of eq. wt.=128 used in Example 1 | 77 | 71 | 69 |
| Diethyl p-N,N-di(2-hydroxyethyl)aminobenzylphosphonate | | 29 | |
| Diethyl p-N,N-di(2-hydroxypropyl)aminobenzylphosphonate | | | 31 |
| Diethyl N,N-di(2-hydroxyethyl)aminomethylphosphonate | 23 | | |
| DC-201 | 2 | 2 | 2 |
| N,N,N',N'-tetramethyl-1,3-butanediamine | 1 | 1 | 1 |
| Triethylamine | 0.6 | 0.4 | 0.4 |
| Freon-11B | 35 | 34 | 34 |

Each of the polyol mixes prepared as described above were stored in sealed containers at approximately 25° C. for a total of 60 days. At zero days, 30 days, and 60 days aliquots of 68.7 g. of each polyol mix were mixed with 56 g. of PAPI®. Mixing was accomplished with a high speed stirrer for 10 seconds and the mixtures were transferred to 32 oz. plastic-coated paper cups and allowed to foam freely. The cream time, rise time (time to reach top of cups) and final rise time (time at which no further rise occurred) were observed. These observations are recorded in Table I. The polyols B and C showed no significant variation in cream time, rise time, or final rise time over the period of 60 days indicating no change in reactivity of these formulations on storage. The formulation A showed a gradual increase in cream time, rise time, and final rise time over the period of 60 days indicating a decrease in reactivity of this polyol on storage.

TABLE I

| Formulation | Cream or rise times (sec.) | Storage time | | |
|---|---|---|---|---|
| | | 0 days | 30 days | 60 days |
| A | Cream time | 13 | 18 | 19 |
| | Rise time | 38 | 46 | 49 |
| | Final rise | 180 | 240 | 291 |
| B | Cream time | 13 | 12 | 12 |
| | Rise time | 24 | 25 | 27 |
| | Final rise | 140 | 160 | 145 |
| C | Cream time | 14 | 17 | 16 |
| | Rise time | 51 | 53 | 57 |
| | Final rise | 206 | 230 | 232 |

EXAMPLE 5

The stability trials described in Example 4 were repeated using polyol mixes A', B', and C' which corresponded to the polyol mixes A, B, and C respectively employed in Example 4 save that the Freon 11-B content was reduced to 25 parts in each case and 0.5% of water based on total formulation weight was added to each mix. The results obtained are recorded in Table II and demonstrate that polyol mixes B' and C' had remained unchanged in reactivity after storage for 60 days at approximately 25° C. whereas the reactivity of polyol mix A' had decreased significantly over the same period of storage.

TABLE II

| Formulation | Cream and rise times (sec.) | Storage time | | |
|---|---|---|---|---|
| | | 0 days | 30 days | 60 days |
| A' | Cream time | 22 | 19 | 23 |
| | Rise time | 67 | 60 | 82 |
| | Final rise | 370 | 395 | 466 |
| B' | Cream time | 18 | 18 | 18 |
| | Rise time | 48 | 45 | 46 |
| | Final rise | 358 | 363 | 355 |
| C' | Cream time | 18 | 17 | 17 |
| | Rise time | 64 | 59 | 61 |
| | Final time | 393 | 391 | 410 |

We claim:
1. A storage stable premix for reaction with an organic polyisocyanate to form a fire retardant polyurethane foam, said premix consisting essentially of:
  (a) a polyol adduct produced by reacting under hy- droxyalkylation conditions from 2 to 20 molecular equivalents of propylene oxide and one amine equivalent of a polyamine mixture, 100 parts of said polyamine mixture containing from 35 to 90 parts of methylene dianilines, the remaining parts being triamines and polyamines of higher molecular weight, said polyamine mixture having been formed by acid condensation of aniline and formaldehyde;

(b) a phosphorus containing polyol having the formula:

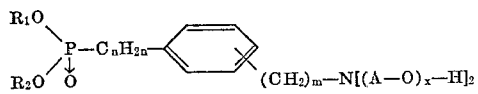

wherein $R_1$ and $R_2$ each represent lower-alkyl, A represents alkylene having 2 carbon atoms separating the valencies and having a total carbon atom content of 2 to 8, inclusive, $n$ is an integer from 0 to 8, inclusive, $m$ is an integer from 0 to 1, and $x$ is an integer from 1 to 3, inclusive;

(c) a blowing agent selected from the class consisting of water, a halogenated aliphatic hydrocarbon having a boiling point below about 110° C., and mixtures of water and said halogenated aliphatic hydrocarbon; and (d) a polyurethane tertiary amine catalyst.

References Cited

UNITED STATES PATENTS

| | | | |
|---|---|---|---|
| 3,076,010 | 1/1963 | Beck et al. | 260—461 |
| 3,134,742 | 5/1964 | Wismer et al. | 260—2.5 |
| 3,134,800 | 5/1964 | Kagan et al. | 260—456 |
| 3,142,650 | 7/1964 | Friedman | 260—2.5 |
| 3,142,651 | 7/1964 | Friedman | 260—2.5 |
| 3,144,419 | 8/1964 | Guttag | 260—2.5 |
| 3,274,130 | 9/1966 | Oertel et al. | 260—2.5 |

FOREIGN PATENTS

| | | |
|---|---|---|
| 1,143,022 | 8/1963 | Germany. |

OTHER REFERENCES

Kagan et al.: Jour. Am. Chem. Soc., vol. 81, pp. 3026 to 3031, June 20, 1959.

DONALD E. CZAJA, *Primary Examiner.*

H. S. COCKERAM, *Assistant Examiner.*

U.S. Cl. X.R.

260—77.5, 584, 563, 611, 920